(12) United States Patent
Bang (10) Patent No.: US 6,522,530 B2
(45) Date of Patent: Feb. 18, 2003

(54) COMPUTER SYSTEM HAVING A MONITOR MOVABLY COUPLED TO A MAIN BODY

(75) Inventor: Seog Bang, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 82 days.

(21) Appl. No.: 09/791,577

(22) Filed: Feb. 26, 2001

(65) Prior Publication Data

US 2002/0015282 A1 Feb. 7, 2002

(30) Foreign Application Priority Data

Aug. 4, 2000 (KR) ........................................ 2000-45284

(51) Int. Cl.[7] .............................. H05K 7/14; G06F 1/16
(52) U.S. Cl. ...................... 361/681; 361/683; 361/801; 361/825; 16/367; 248/220.21; 248/917
(58) Field of Search ................................. 361/679, 681, 361/682, 683, 686, 801, 825; 248/200, 220.21, 917–924; 16/367

(56) References Cited

U.S. PATENT DOCUMENTS

| | | | |
|---|---|---|---|
| 4,691,886 A | * | 9/1987 | Wendling et al. ...... 248/123.11 |
| 5,294,994 A | | 3/1994 | Robinson et al. |
| 5,668,570 A | | 9/1997 | Ditzik |
| 5,831,817 A | | 11/1998 | Chang |
| 5,973,915 A | | 10/1999 | Evans |
| 6,061,231 A | | 5/2000 | Crockett |
| 6,064,373 A | | 5/2000 | Ditzik |
| 6,081,420 A | | 6/2000 | Kim et al. |
| 6,113,046 A | * | 9/2000 | Wang ...................... 248/278.1 |
| 6,347,433 B1 | * | 2/2002 | Novin et al. ................... 16/342 |
| 6,378,830 B1 | * | 4/2002 | Lu ............................... 16/337 |
| 6,411,271 B1 | * | 6/2002 | Bang et al. .................. 248/920 |

* cited by examiner

*Primary Examiner*—Jayprakash N. Gandhi
(74) *Attorney, Agent, or Firm*—Robert E. Bushnell, Esq.

(57) ABSTRACT

A computer system includes a monitor assembled with a main body. The computer system further has a swiveling member installed between the main body and the monitor, for allowing the monitor to be laterally swivelled relative to the main body, and a tilting member assembled with the swiveling member, for allowing the monitor to be tilted transversely relative to the swiveling movement of the swiveling member. With this configuration, the monitor can be tilted and swiveled relative to the main body.

17 Claims, 8 Drawing Sheets

FIG. 8

COMPUTER SYSTEM HAVING A MONITOR MOVABLY COUPLED TO A MAIN BODY

CLAIM OF PRIORITY

This application makes reference to, incorporates the same herein, and claims all benefits accruing under 35 U.S.C. §119 from an application entitled Computer earlier filed in the Korean Industrial Property Office on Aug. 4, 2000, and there duly assigned Ser. No. 2000-45284 by that Office.

BACKGROUND OF THE INVENTION

1. Technical Field

The present invention relates in general to computer systems, and more particularly, to a computer system having a monitor movably coupled to a main body.

2. Description of Background Art

A computer system (sometimes referred to simply as a "computer") usually includes a main body having a central processing unit (CPU) and a random access memory (RAM), etc., a monitor electrically connected to the main body, for displaying pictures to the outside, and an input unit including a keyboard for inputting information and data into the main body, and a mouse, etc. The main body further includes a disk drive, and a variety of cards such as a graphic card, etc.

The speed of processing data is determined depending upon the speed of the CPU and the capacity of the RAM, etc. Recently, computers have been developed with a higher speed of processing data according to the development of semiconductors and CPU techniques. Especially, personal computers as well as host computers called "servers" used in networks have been actively developed.

A personal computer can be categorized into a desktop computer and a notebook computer. The desktop computer separately has a main body, a monitor and a keyboard. The notebook computer integrally includes the main body, the monitor and the keyboard, making it convenient to carry the notebook computer.

In the case of the notebook computer, the monitor is only allowed to move up and down (i.e, tilt) relative to the main body. In order for the monitor of the notebook computer to be viewed by some persons around the user of the computer, the main body with which the monitor is assembled, has to be moved in a horizontal direction (i.e., swivel), making it inconvenient to use the computer. Especially, where the size of the main body is extended considering the capacity of a memory or an integration level of a card, etc., it is not easy to swivel the main body of the computer system.

Exemplars of the art are U.S. Pat. No. 6,081,420 issued to Kim et al. for LCD DISPLAY APPARATUS, U.S. Pat. No. 6,064,373 and U.S. Pat. No. 5,668,570 issued to Ditzik for DESKTOP COMPUTER WITH ADJUSTABLE FLAT PANEL SCREEN, U.S. Pat. No. 6,061,231 issued to Crockett for COMPUTER DISPLAY ASSEMBLY, U.S. Pat. No. 5,973,915 issued to Evans for PIVOTABLE DISPLAY FOR PORTABLE ELECTRONIC DEVICE, U.S. Pat. No. 5,831,817 issued to Chang for COMPUTER APPARATUS HAVING A MOVABLE LIQUID CRYSTAL DISPLAY, and U.S. Pat. No. 5,294,994 issued to Robinson et al. for INTEGRATED COMPUTER ASSEMBLY. I have found that the background art does not show a computer system having a display connected to main body that can have all the viewing angles of the present invention and yet be stably supported and have a compact structure.

SUMMARY OF THE INVENTION

The present invention has been made to overcome the above described problems of the background art, and accordingly, it is an object of the present invention to provide a computer system having a monitor capable of being both tilted and swiveled with respect to the main body.

It is another object to have a computer system that has a display stably connected to a main body of the computer system and yet allow a wide range of viewing angles.

It is still another object to have a compact profile for a display connected to a main body of a computer system that has a wide range of viewing angles.

It is yet another object to have a display that is integral with a mainbody that minimizes the space taken by the monitor while being able have a wide range of viewing angles.

This and other objects of the present invention may be achieved by the provision of a computer system having a monitor integrated with a main body, through which pictures are projected out. The computer system further including a swiveling member installed between the main body and the monitor, for allowing the monitor to be laterally swiveled relative to the main body; and a tilting member assembled with the swiveling member, for allowing the monitor to be tilted transversely relative to the swiveling movement of the swiveling member.

Effectively, the swiveling member has a main body bracket coupled to the main body and having a first hinge hole formed through a plane thereof; and a rotatable bracket rotatably coupled relative to the main body bracket and having a second hinge hole communicating with the first hinge hole.

The computer system further includes an elongated hole having the form of a cam profile and formed through the plane of the main body bracket; and a projection projected out of a plane of the rotatable bracket and inserted into the elongated hole of the main body bracket, defining a rotation degree of the rotatable bracket relative to the main body bracket.

A rotatable pin is integrally inserted into the first and second hinge holes, and a nut provided to at least one end of the rotatable pin, for coupling the rotatable pin to the main body bracket and the rotatable bracket.

The tilting member has a shaft connected to one end of the rotatable bracket, and a monitor bracket whose one end is coupled to the monitor and whose other end is inserted into the shaft, being rotated along the circumference of the shaft. The monitor bracket is provided in a pair, each being detachably connected to each end of the shaft. A rotation limiting unit is provided for limiting the rotation degree of the rotatable bracket relative to the shaft. The rotation limiting unit has a stopper projected out of each end portion of the shaft, and a cut part formed in each monitor bracket, being caught in the stopper with a predetermined locus when the monitor bracket is rotated.

The tilting member includes a shaft connected to one end of the rotatable bracket, and a monitor bracket whose one end is coupled to the monitor and whose other end is inserted into the shaft, being rotated along the circumference of the shaft. The monitor bracket is provided in a pair, each being detachably connected to each end of the shaft.

Preferably, at least one engagement hole is formed in the plane of the main body bracket along the circumference thereof, and the first hinge hole is located in the center thereof. Preferably, the main body is formed with a bracket accommodating portion into which the main body bracket is inserted.

A bracket cover is coupled to the bracket accommodating portion to cover the main body bracket, thereby improving outer appearance of the main body. A bracket accommodating portion is provided on a portion of the monitor toward the main body, for allowing the monitor bracket to be coupled thereto, and a bracket cover coupled to the bracket accommodating portion, for covering at the monitor bracket.

The computer system further includes a compensation part for compensating for a gravity center of the monitor relative to the main body. The compensation part includes a pair of twisted coil springs having one end disposed to the rotatable bracket and having another end disposed to the monitor bracket, being elastically biased opposite to the rotation direction of the monitor bracket. The swiveling member is disposed on a side of the top of the main body. A base plate in a planar type is detachably installed on a bottom of the main body, for supporting the main body and the monitor.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
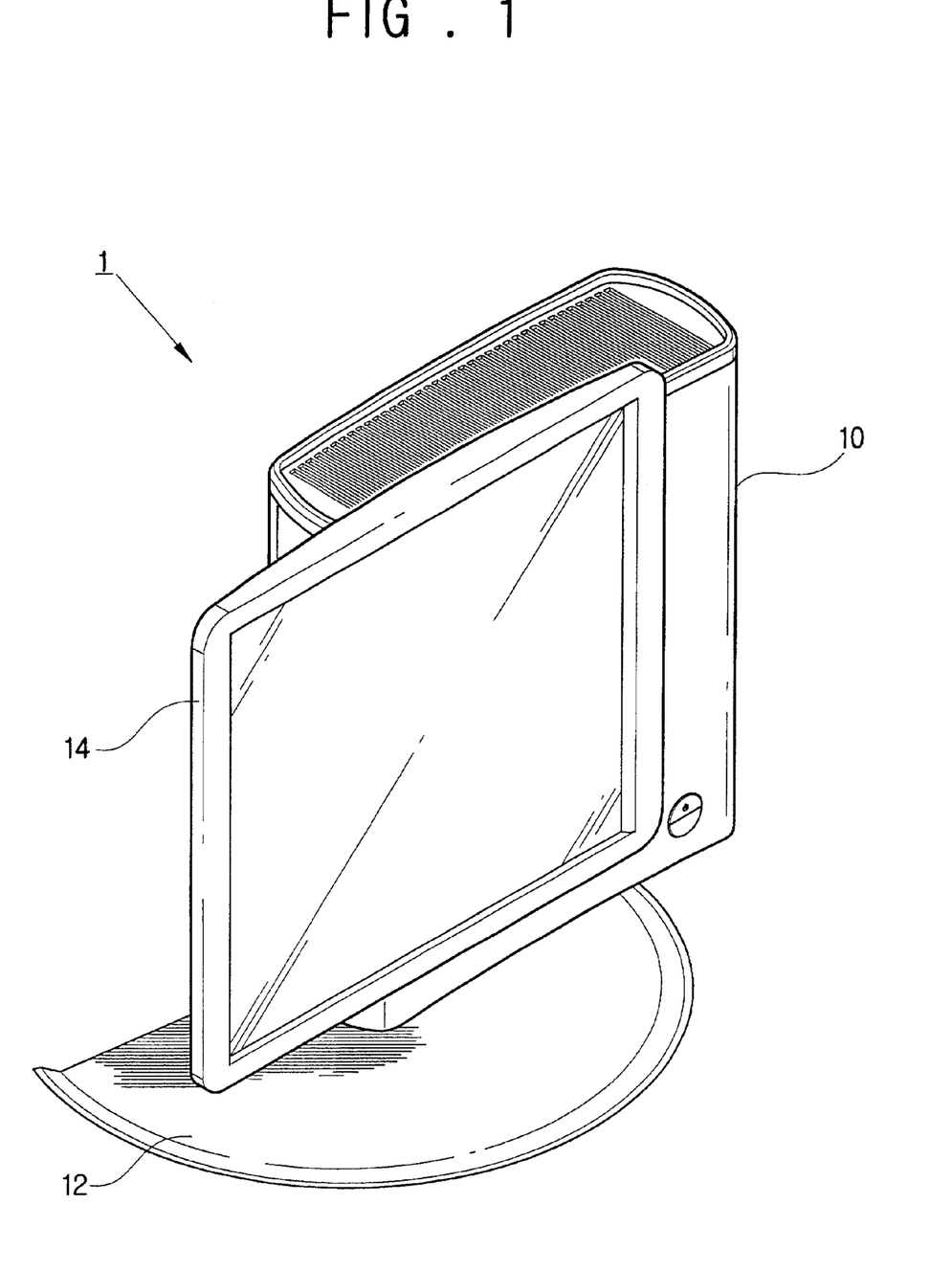
FIG. 1 is a perspective view of a computer system according to an embodiment of the present invention.
Figure 2:
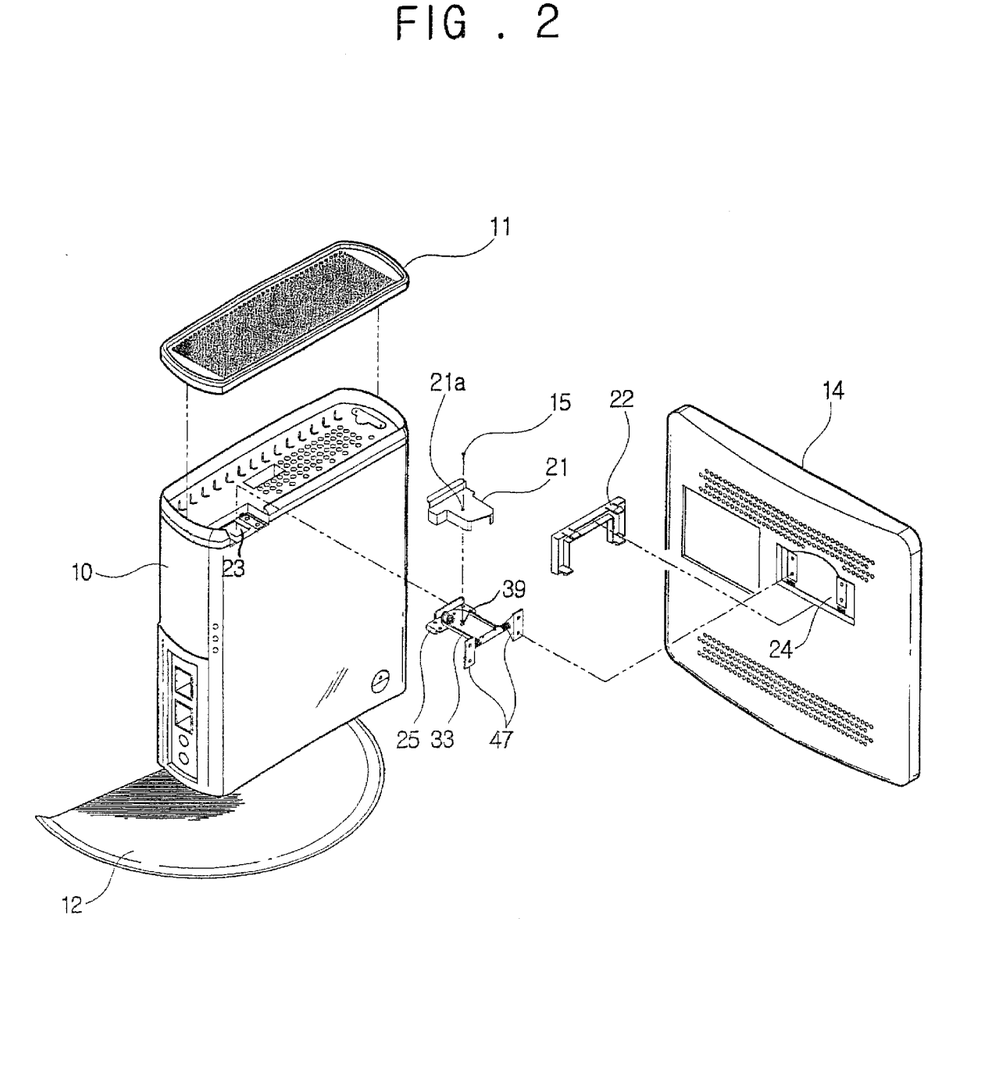
FIG. 2 is an exploded perspective view of the computer system of FIG. 1.

Referring to FIGS. 1 and 2, a computer system 1 according to an embodiment of the present invention has a main body 10, a base plate 12 provided under the bottom of the main body 10, for supporting the main body 10, a monitor 14 suspended from the main body 10, for projecting pictures to the outside, and an input unit (not shown) for inputting information and data into the main body 10.

In the main body 10, there is a main board (not shown) in which a central processing unit (CPU) is mounted. In the main board are installed a random access memory (RAM), a disk drive, a variety of cards including a graphics card, etc. The input unit includes a keyboard and a mouse, etc.

Figure 3:
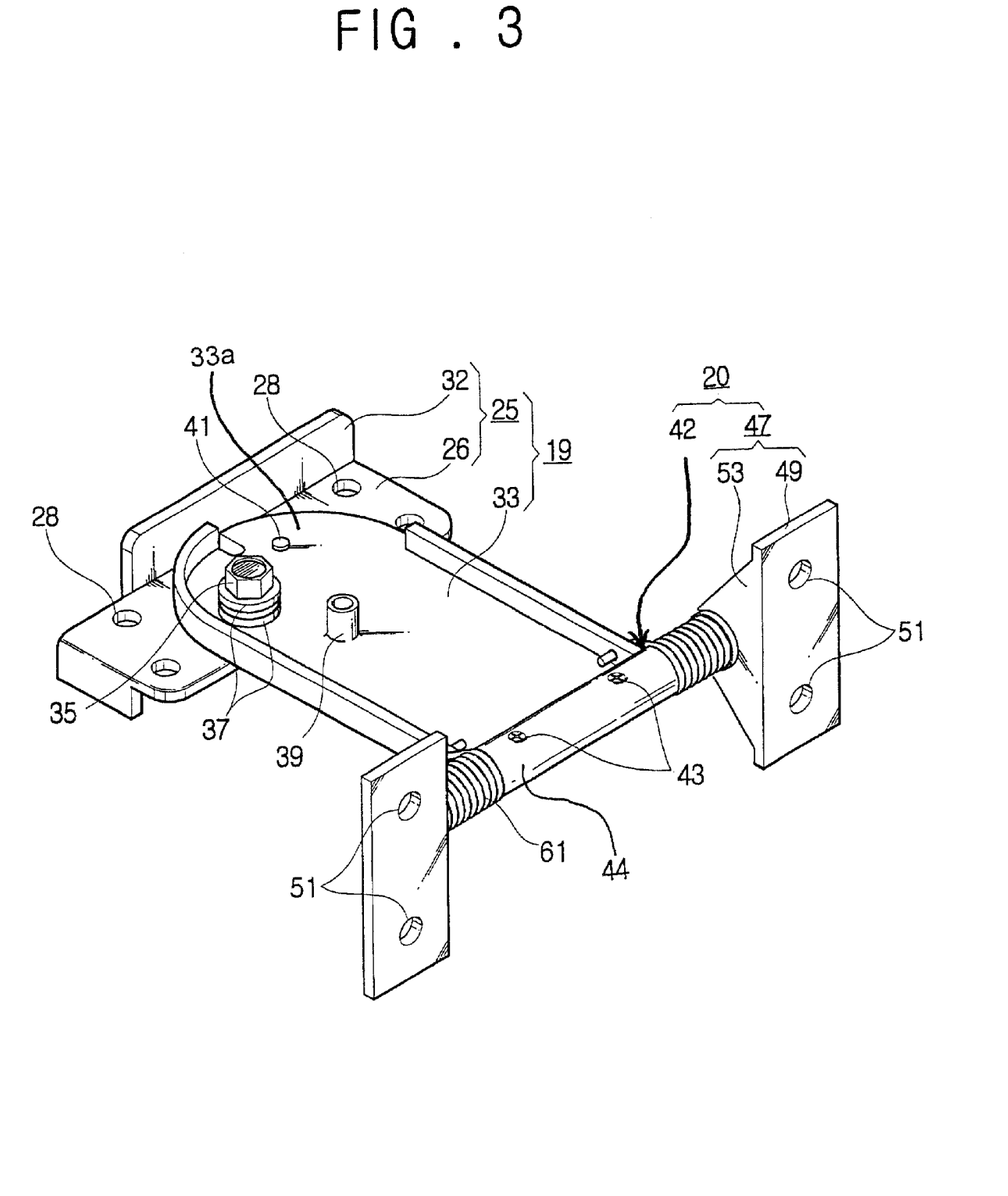
FIG. 3 is an enlarged perspective view of a tilting member and a swiveling member of FIG. 2 in an assembled state.
Figure 4:
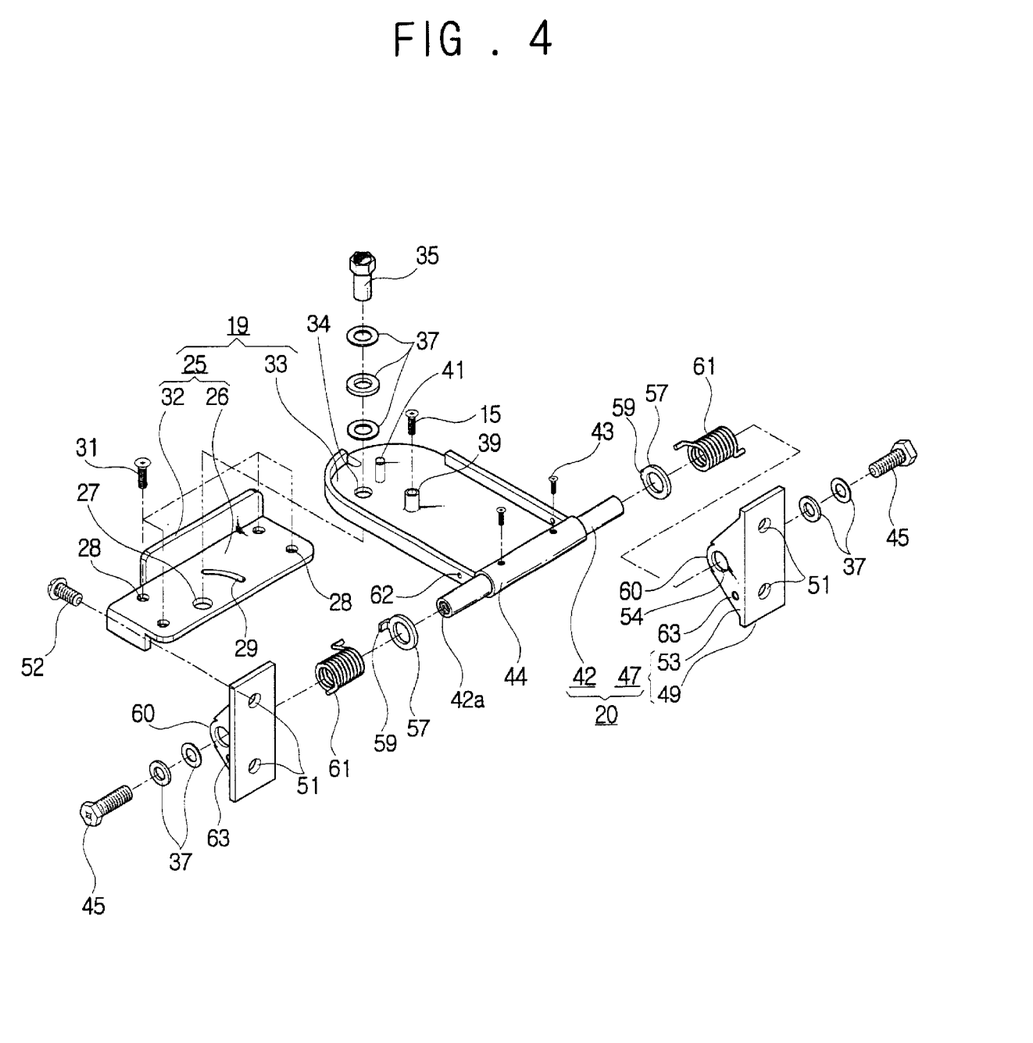
FIG. 4 is an exploded view of the tilting member and the swiveling member of FIG. 3.

As illustrated in FIGS. 3 and 4, a swiveling member 19 and a tilting member 20 are provided between the main body 10 and the monitor 14. The swiveling member 19 allows the monitor 14 suspended from the main body 10 to be swiveled in the horizontal direction relative to the main body 10 whereas the tilting member 20 allows the monitor 14 to be tilted in the vertical direction relative to the main body 10.

In the swiveling member 19 and the tilting member 20 are installed a first bracket cover 21 and a second bracket cover 22 for respectively covering a portion of the swiveling member 19 and that of the tilting member 20 (refer to FIG. 2). The first bracket cover 21 is installed at the main body 21 while the second bracket cover 22 is installed at the monitor 14.

The swiveling member 19 is comprised of a main body bracket 25 assembled with the main body 10 and a rotatable bracket 33 assembled with the main body bracket 25 to be rotatable relative to the main body bracket 25.

The main body bracket 25 includes a base part 26 having a first hinge hole 27 formed through the plane of the base part 26, and a flange part 32 bent from one side of the base part 26. A plurality of engagement holes 28 are formed along the circumferential direction of the base part 26. Between the engagement holes 28 and the first hinge hole 27 is formed an elongated hole 29 in the shape of a curve. A projection 41 (to be described later) of the rotatable bracket 33 is received in the elongated hole 29. A rotation degree of the rotatable bracket 33 is defined relative to the mainbody bracket 25 by an interaction of the elongated hole 29 and the projection 41. The main body bracket 25 is engaged into a bracket accommodating portion 23 depressed in the upper face of the main body 10 (refer to FIG. 2). The bottom face of the bracket accommodating portion 23 is formed of a steel plate for engagement with the main body bracket 25. The main body bracket 25 is provided on one side of the upper face of the main body 10, in order to increase the degree of swiveling the monitor 14 relative to the mainbody 10. However, although the swiveling member 19 is centrally disposed on the upper face of the main body 10, there will be no problems in embodying the idea and concept of the present invention.

A round portion 33a of the rotatable bracket 33 rests upon the base part 26 of the main body bracket 25 whereas the other portion of the rotatable bracket 33 has a shaft accommodation portion 44 into which a shaft 42 to be described later is engaged. The round portion 33a of the rotatable bracket 33 facilitates rotation of the rotatable bracket 33 relative to the main body bracket 25. In consideration of this, in a modified embodiment of the present invention having no formation of the flange part 32 relative to the main body bracket 25, there is no need to make one portion of the rotatable bracket 33 rounded.

A second hinge hole 34 communicates with the first hinge hole 27. A rotatable pin 35 is inserted into the first hinge hole 27 and second hinge hole 34 so that the rotatable bracket 33 is swivelled relative to the main body bracket 25. To prevent the rotatable pin 35 from being separated from the main body bracket 25 and the rotatable bracket 33, a nut (not shown) may be provided on one portion of the rotatable pin 35 and a plurality of washers 37 may be intervened therebetween.

A boss 39 having a thread groove is projected on the upper face of the rotatable bracket 33. The first bracket cover 21 is coupled with the rotatable bracket 33 by passing a screw 15 through a through hole 21a of the first bracket cover 21 (refer to FIG. 2) to be engaged with the boss 39. The boss 39 is disposed on the rotatable bracket 33. In the bottom of the rotatable bracket 33 is provided the projection 41 defining a rotation degree of the rotatable bracket 33 by moving within the elongated hole 29 of the main body bracket 25.

The tilting member 20 includes the shaft 42 inserted into the shaft accommodating portion 44 of the rotatable bracket 33, and a bracket for monitor 47 having one end coupled to the monitor 14 and having another end coupled on the shaft 42 so that the monitor bracket 47 can be rotated along a radial direction of the shaft 42.

The shaft 42 is secured in the shaft accommodating portion 44 of the rotatable bracket 33 by a set screw 43. The shaft 42 is projected outside from both ends of the shaft accommodating portion 44. Monitor brackets 47 are respectively coupled to the opposite projected ends of the shaft 42. Screw threads 42a to be engaged with screws 45 to be described later are formed in both ends of the shaft 42.

The monitor bracket 47 has a coupling part 49 inserted into the bracket accommodating portion 24 to be coupled therewith (refer to FIG. 2), and a bent part 53 approximately perpendicularly bent from the coupling part 49. On the plane of the coupling part 49 are formed screw holes 51 for allowing the coupling part 49 to be coupled with the bracket accommodating portion 24 by screws 52. On the plane of the bent part 53 is formed a shaft hole 54 into which one end of the shaft 42 is rotatably inserted. With this configuration, the monitor bracket 47 allows the monitor 14 to be tilted relative to the main body 10.

According to the embodiment of the present invention, there is provided a unit for limiting the tilting degree of the monitor 14 relative to the main body 10 by defining the rotation degree of the monitor bracket 47.

The limiting unit has a ring member 57 having a rib 59 projected toward the bent part 53 of the monitor bracket 47, in a portion along the circumference thereof, for being forcedly fitted into the shaft 42, and a cut part 60 formed by partially cutting a free end of the bent part 53. When the monitor bracket 47 is tilted relative to the shaft 42, the rib 59 of the ring member 57 is moved within the cut part 60, thereby limiting the tilting degree of the monitor 14.

Alternatively, as a unit for limiting the tilting degree of the monitor 14 relative to the main body 10, a pin-type stopper (not shown) may be formed on the circumference of the shaft 42, instead of the ring member 57 with the rib 59, the stopper being able to be moved within the cut part 60.

For the forced fitting, it is preferable to fit the ring member 57 onto the shaft 42 by thermal shrinkage. However, the ring member 57 may be fitted into the shaft 42 in the form of a spline.

Between the monitor bracket 47 and the shaft 42 may be provided a compensation part for compensating for the gravity center of the monitor 14 relative to the monitor 14. In the above-described embodiment, the compensation part has a pair of twisted coil springs 61 having first ends disposed in the rotatable bracket 33 and the other ends of the pair of the twisted coil springs 14 disposed in the monitor bracket 47, which are elastically biased opposite to the rotation direction of the monitor bracket 47. Holes 62 and 63 through which both ends of each twisted coil spring 61 are coupled are respectively formed in the rotatable bracket 33 and the monitor bracket 47.

For this configuration, the swiveling member 19 and the tilting member 20 are assembled in the following process. The top cover 11 is disassembled from the main body 10, and then the base part 26 of the main body bracket 25 is disposed in the bracket accommodating portion 23 of the main body 10. The main body bracket 25 is assembled into the bracket accommodating portion 23 by inserting screws 31 into the respective engagement holes 28. After the main body bracket 25 is secured, one portion of the rotatable bracket 33 rests upon the base part 26 and the rotatable pin 35 is inserted into the first and second hinge holes 27 and 34 for coupling. The projection 41 formed in the rotatable bracket 33 is accommodated within the elongated hole 29 of the main body bracket 25. After securing the shaft 42 into the shaft accommodating portion 44 of the rotatable bracket 33 with the set screw 43, the ring member 57, the twisted coil spring 61 and the monitor bracket 47 are inserted in sequence into each end of the shaft 42 and then the plurality of washers are intervened therebetween. They are engaged with the screws 45. At this time, the rib 59 of the ring member 57 is disposed within the cut part 60 of the monitor bracket 47. After all elements are assembled, the coupling part 49 of the monitor bracket 47 is disposed in the bracket accommodating portion 24 of the monitor 14 and coupled with the monitor by the screw 52. The bracket accommodating portions 23 and 24 are respectively coupled with the first and second bracket covers 21 and 22. Hence, the assemblage of the swiveling member 19 and the tilting member 20 is completed.

Figure 5:
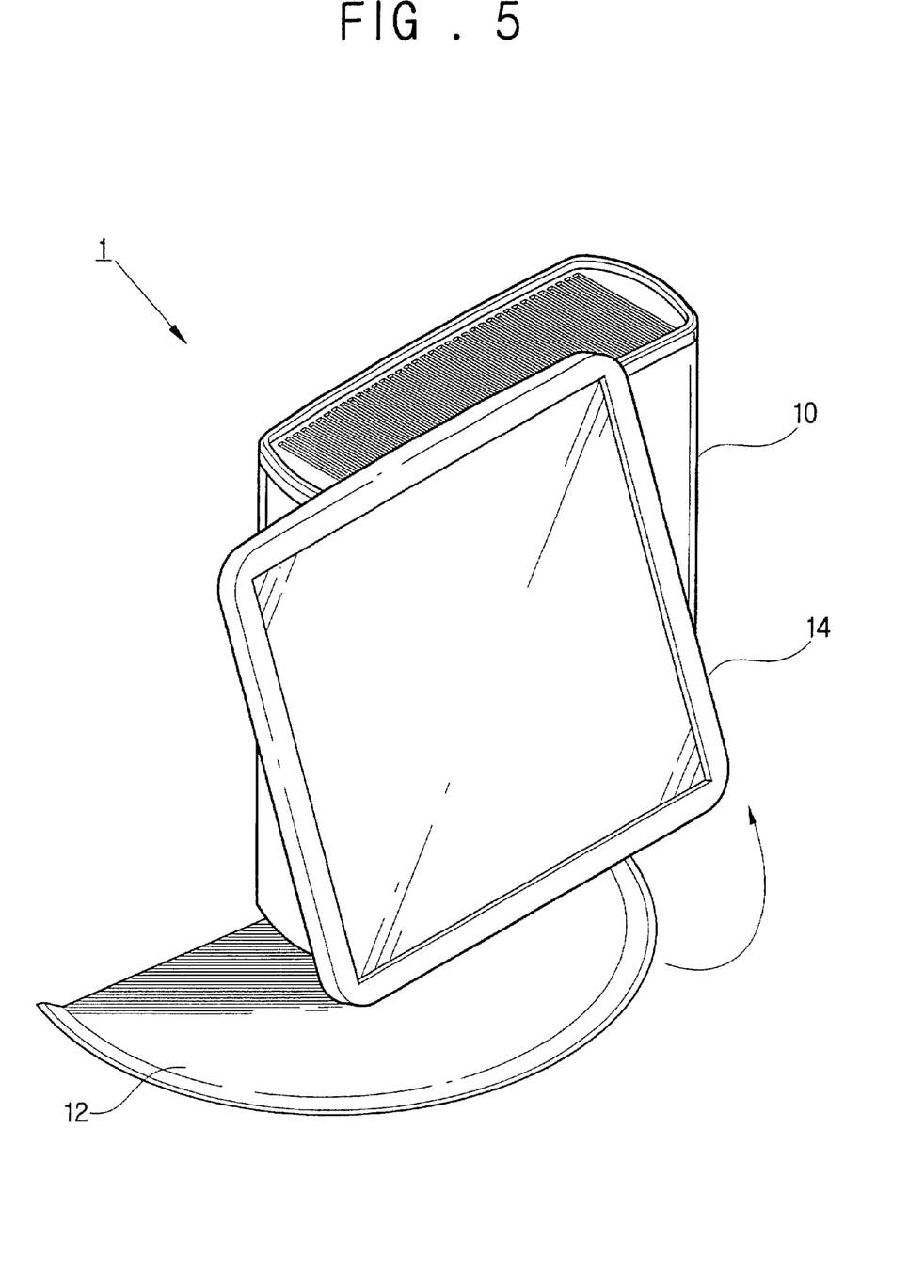
FIG. 5 is a view showing a tilting operation of the computer system according to the present invention.
Figure 6:
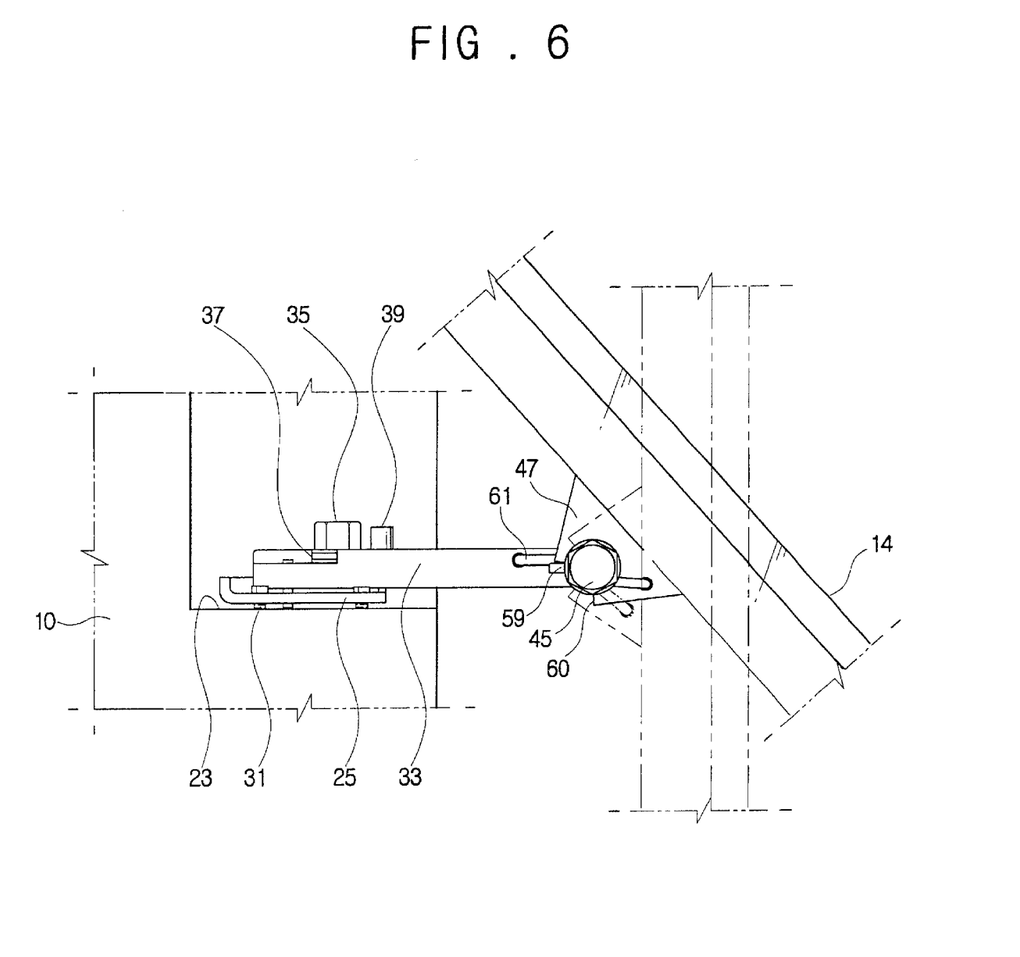
FIG. 6 is a view showing an operation of the tilting member and the swiveling member of FIG. 5.

Referring to FIGS. 5 through 8, the swiveling operation and the tilting operation of the monitor 14 relative to the main body 10 are described as follows. As shown in FIG. 5, if the monitor 14 is tilted upward relative to the main body 10, the monitor bracket 47 is rotated counterclockwise along the circumference of the shaft 42 to allow the monitor 14 to be tilted upward. Where the monitor is tilted, the rib 59 of the ring member 57 is caught by the end of the cut part 60. Therefore, the tilting degree of the monitor can be limited. Through the same manner as described above, the monitor can be tilted downward.

Figure 7:
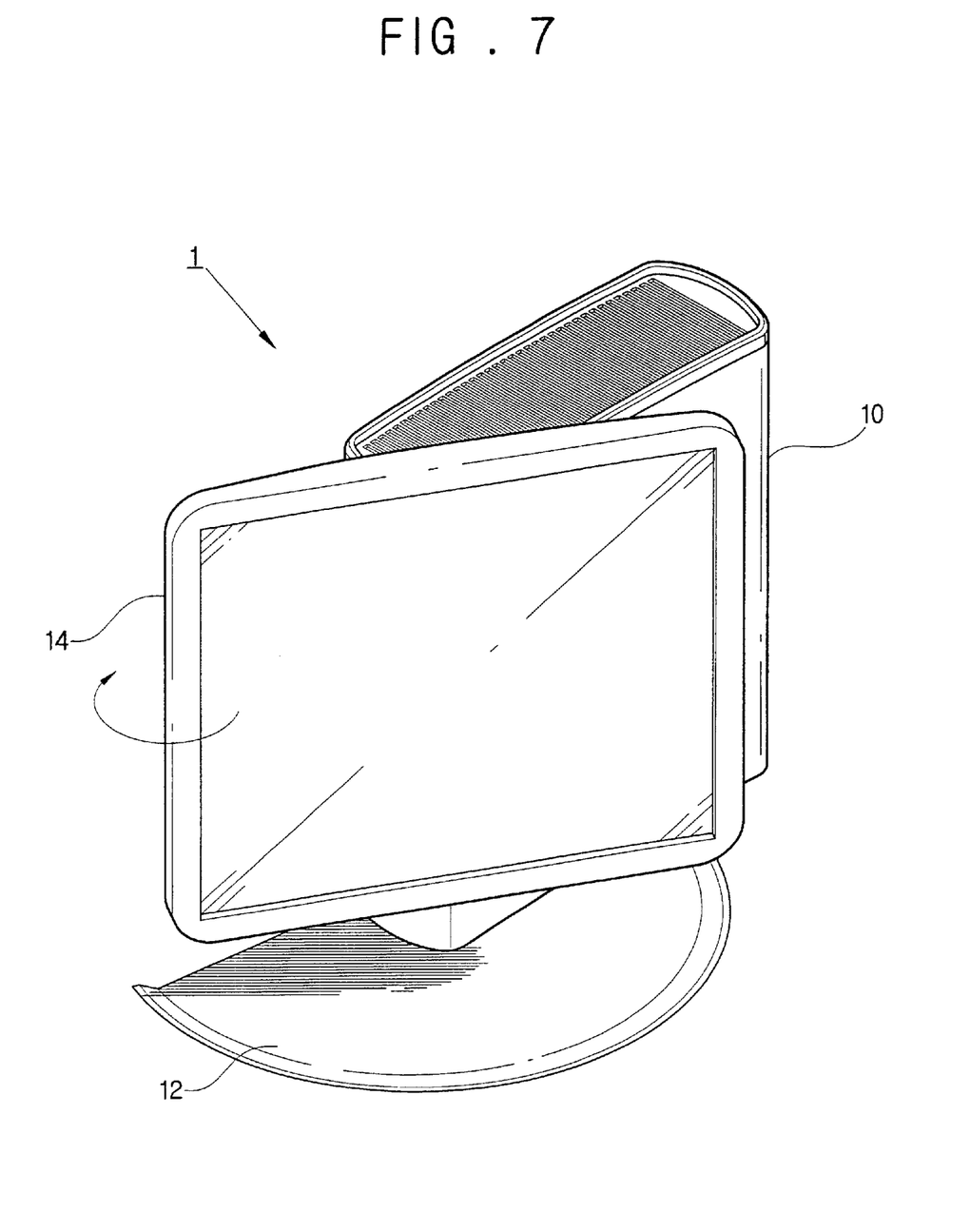
FIG. 7 is a view showing a swiveling operation of the computer system according to the present invention.
Figure 8:
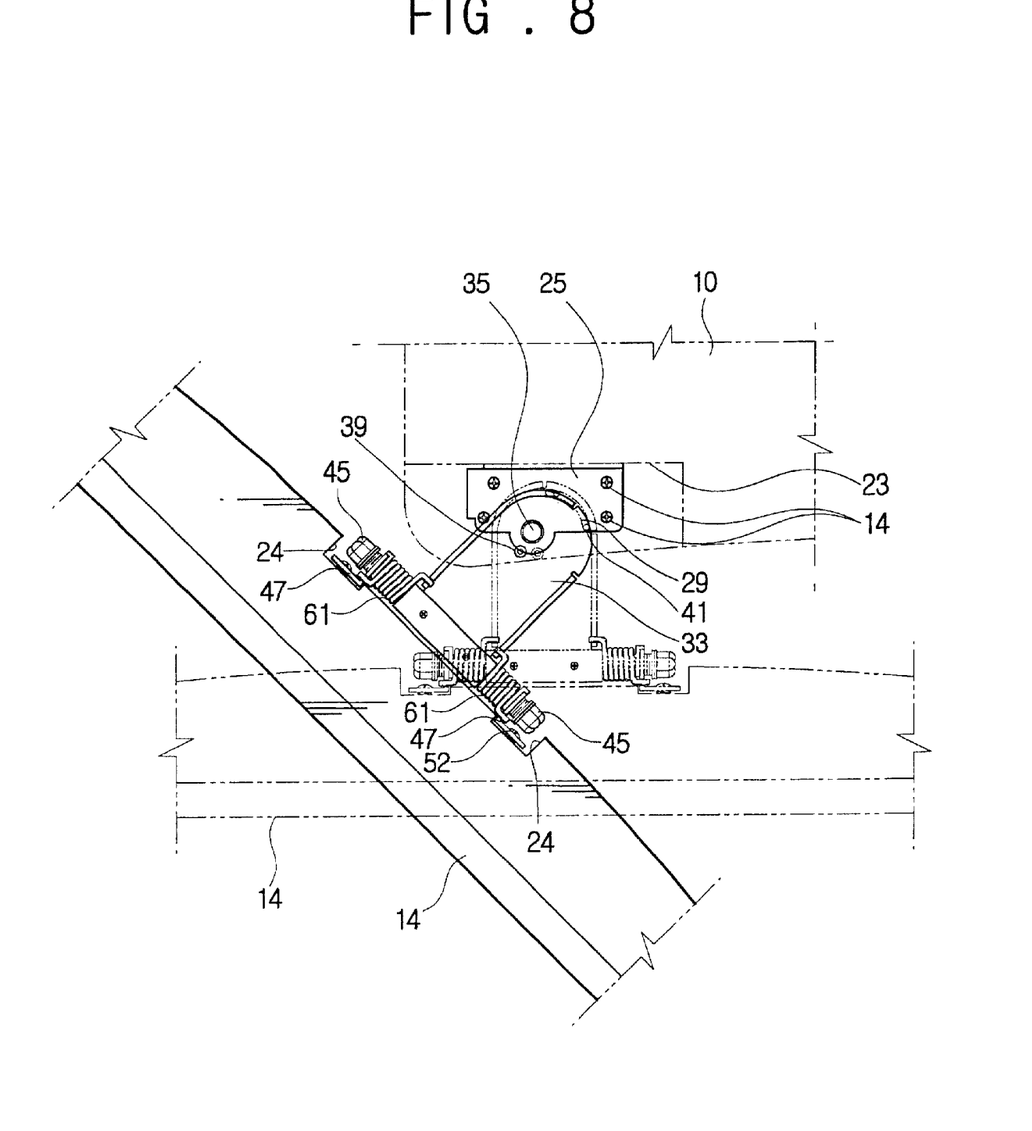
FIG. 8 is a view showing an operation of the tilting member and the swiveling member of FIG. 7.

As illustrated in FIG. 7, where the monitor 14 is swiveled on the left relative to the main body 10, the rotatable bracket 33 is rotated clockwise to a predetermined degree around the rotatable pin 35, as shown in FIG. 7. The monitor 14 can be swiveled relative to the main body 10 and the projection 41 formed in the rotation bracket 33 is accommodated in the elongated hole 29 of the main body bracket 25. The swivel degree of the monitor 14 is limited by the projection 41 received in the elongated hole 29. Through the same manner as described above, the monitor can be swiveled on the right.

According to the present invention, the monitor 14 can be tilted and swiveled relative to the main body 10 without need of moving the main body 10, by providing the swiveling member 19 and the tilting member 20 between the main body 10 and the monitor 14.

In the above-described embodiment, the swiveling member 19 includes the main body bracket 25 and the rotatable bracket 33 whereas the tilting member 20 includes the shaft 42 and the monitor bracket 47. However, they can be switched in a modified embodiment of the present invention. Even though it is not shown in the figures, the present invention can be applied to a conventional notebook computer.

As described above, the computer system according to the present invention allows the users surrounding it to easily view the monitor without moving the monitor, by enabling the monitor to be tilted and swiveled relative to the main body.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer system, comprising:
   a main body having a plurality of electrical components to control the computer system;

a monitor assembled with the main body, providing a variable video display of the data from the main body;

a swiveling member installed between the main body and the monitor allowing the monitor to be laterally swiveled relative to the main body, and a tilting member assembled with said swiveling member allowing the monitor to be tilted transversely relative to the swiveling movement of said swiveling member, with said swiveling member comprising:

a first bracket coupled to the main body and having a first hinge hole formed through a plane of said first bracket; and a second bracket rotatably coupled relative to said first bracket and having a second hinge hole communicating with the first hinge hole.

2. The computer system according to claim 1, further comprising:

an elongated hole having a form of a cam profile and formed through the plane of said first bracket; and a projection projected out of a plane of said second bracket and inserted into the elongated hole of said first bracket, defining a rotation degree of the second bracket relative to said first bracket.

3. The computer system according to claim 1, further comprising:

a rotatable pin integrally inserted into the first and second hinge holes; and a nut provided to at least one end of said rotatable pin, said nut coupling said rotatable pin to said first bracket and said second bracket.

4. The computer system according to claim 1, with said tilting member comprising:

a shaft connected to one end of said second bracket; and a third bracket having one end coupled to the monitor and a second end inserted into said shaft, said third bracket being rotated along a circumference of said shaft.

5. The computer system according to claim 4, further comprising another one of said third bracket, said pair of third brackets being detachably connected to each end of said shaft.

6. The computer system according to claim 5, further comprising a first unit for limiting the rotation degree of said second bracket relative to said shaft.

7. The computer system according to claim 6, with said first unit comprising:

a stopper projected out of each end portion of said shaft; and a cut part formed in each one of said third brackets, the cut part being caught in said stopper with a predetermined locus when said third bracket is rotated.

8. The computer system according to claim 4, further comprising a compensation part for compensating a center of gravity of the monitor relative to the main body.

9. The computer system according to claims 8, with said compensation part comprising a pair of twisted coil springs having one end disposed to the second bracket and a second end being disposed to said third bracket, said pair of twisted coil springs being elastically biased opposite to the rotation direction of said third bracket.

10. The computer system according to claim 1, with at least one engagement hole being formed in the plane of said first bracket along the circumference said first bracket, and the first hinge hole being located in the center of said first bracket.

11. The computer system according to claim 1, with said swiveling member being disposed on a side of the top of the main body.

12. The computer system according to claim 4, further comprising:

a bracket accommodating portion provided on a portion of the monitor toward the main body, said bracket accommodating portion allowing said tilting member to be coupled thereto; and a bracket cover coupled to said bracket accommodating portion to cover said third bracket.

13. A computer system, comprising:

a main body having a plurality of electrical components to control the computer system;

a monitor assembled with the main body, providing a variable video display of the data from the main body;

a swiveling member installed between the main body and the monitor allowing the monitor to be laterally swiveled relative to the main body; and a tilting member assembled with said swiveling member allowing the monitor to be tilted transversely relative to the swiveling movement of said swiveling member, with said tilting member comprising:

a shaft connected to one end of said swiveling member;

a third bracket having one end coupled to the monitor and a second end inserted into said shaft, said third bracket being rotated along a circumference of said shaft, another one of said third bracket, said pair of third brackets being detachably connected to each end of said shaft; and a limiting unit limiting the rotation degree of a second bracket relative to said shaft, with said limiting unit comprising:

a stopper projected out of each end portion of said shaft; and a cut part formed in each said third bracket, the cut part being caught in said stopper with a predetermined locus when the third bracket is being rotated.

14. A method for assembling a computer with a monitor, comprising:

disassembling a top cover from a main body of a computer system, said main body having a plurality of electrical components controlling the computer system;

disposing abase part of a first bracket in a bracket accommodating portion of said main body;

securing said first bracket to said bracket accommodating portion by inserting fastening members into respective holes of said first bracket and said bracket accommodating portion, said first bracket having a first hinge hole;

attaching a portion of a second bracket upon said base part, said second bracket rotatably coupled relative to said first bracket and having a second hinge hole aligned with the first hinge hole;

inserting a pin into the first and second hinge holes for coupling said second bracket with said first bracket;

inserting a projection formed on said second bracket into an elongated hole formed on said first bracket, the elongated hole having a form of a cam profile and formed through the plane of said first bracket;

securing a shaft into a shaft accommodating portion of said second bracket with a fastening member;

inserting in sequence a ring member, a twisted coil spring and a third bracket into each end of said shaft with a plurality of washers between each, said third bracket rotatable along a circumference of said shaft, said ring member being circular and having a rib, said ring member being disposed within a cut part of said third bracket, said twisted coil springs compensating a center of gravity of a monitor relative to said main body;

disposing a coupling part of said third bracket in a bracket accommodating portion of said monitor, said monitor providing a variable video display from the data of said main body; and fastening said third bracket to said monitor.

15. The method of claim 14, further comprising the step of covering said bracket accommodating portion of said main body with a first bracket cover and said bracket accommodating portion of said monitor with a second bracket cover.

16. The method of claim 15, with said swiveling member being disposed on a side of the top of said main body and adjacent to a corner of said main body.

17. The method of claim 16, further comprising the step of installing a base plate in a planar type detachably on a bottom of said main body, said base plate supporting said main body and said monitor.

* * * * *